Patented Mar. 18, 1924.

1,487,046

UNITED STATES PATENT OFFICE.

GEORGE B. BURNHAM, OF BOROSOLVAY, CALIFORNIA.

PROCESS OF RECOVERING VARIOUS SALTS FROM SALINE LIQUORS.

No Drawing.     Application filed June 16, 1919.   Serial No. 304,500.

*To all whom it may concern:*

Be it known that I, GEORGE B. BURNHAM, a citizen of the United States, residing at Borosolvay, in the county of San Bernardino and State of California, have invented new and useful Improvements in Processes of Recovering Various Salts from Saline Liquors, of which the following is a specification.

This invention relates to the process of recovering the separate salts from concentrated saline liquors containing two or more salts by means of using natural weather changes.

An object of the invention is to provide a cheap process for recovering the various salts from saline liquors.

Hitherto, when various salts have been recovered from saline liquors, artificial means have been used to effect the separation of the different salts. By my improved process, however, I expose the liquor to a natural change in the weather and thereby effect a separation. This change in weather can be the change experienced between stormy weather and fair weather, wind and calm, day and night, and the seasons of the year.

In the preferred form of my process liquors containing two or more salts in solution are evaporated in solar ponds, or large vats exposed to the open air. Certain salts crystallize out due to this evaporation. As soon as a certain change in the weather is about to take place the liquor is transferred to another pond and other salts are crystallized out due to this change of weather.

It is necessary that the liquor be controlled in such fashion that it will be in proper condition to meet expected weather changes. Such control is obtained by placing the liquor at the proper time in ponds of suitable depth and size. In this manner certain temperature and evaporation is obtained and the desired changes in the weather crystallizes out the different salts. Not every change in the weather crystallizes out the salts, and a transfer of the liquor is not always required. Salts that are of no value can be allowed to crystallize out on top of each other in the same pond without necessitating a transfer of the liquor as the weather changes.

I shall describe my process as it has been applied to Searles Lake, in California, but it is understood that the process is not limited to this particular brine, although it is particularly applicable to subterranean saline liquors, such as exist in Searles Lake. In its subterranean location, the liquor is maintained at a constant temperature and is not subject to evaporation. Searles Lake brine contains sodium, potassium, chloride, sulfate, carbonate, and borate ions.

In making use of seasonal weather changes it is preferred to take the lake brine from its subterranean location in the fall of the year. The brine is pumped into solar ponds where it evaporates and cools a little in the temperature of fall. Sodium chloride and sodium sulfate are crystallized out. In the winter as the weather becomes cold the brine is transferred to other ponds and sodium sulfate, sodium carbonate, and borax crystallize out. As the weather warms up again the brine is transferred to other ponds. During spring and summer sodium chloride, and sometimes potassium sodium sulfate, crystallize out. In the fall when the weather becomes cold again the brine is transferred to another pond and potassium chloride crystallizes out. The brine remains in this pond until further change in the weather begins to crystallize still another salt, such as borax, whereupon the brine is again transferred to another pond. In the winter the brine may be added to fresh brine from the lake and the process repeated.

In making use of the change in the weather between day and night the brine may be taken in the summer when it is observed that both sodium chloride and potassium sodium sulfate are going to crystallize out. The brine evaporates during the day and crystallizes sodium chloride. In the evening the brine is transferred to another pond and potassium sodium sulfate is crystallized out due to the cooler weather of the night. Similarly, the daily changes of the weather in the winter can also be used to effect a separation of the winter salts.

In making use of the change between calm and windy weather the brine, while cooling late in the fall and crystallizing out potassium chloride, is allowed to become supersaturated with borax in calm weather. Upon the approach of a strong wind storm which causes agitation the brine is quickly flowed into another pond, whereupon the supersaturated borax crystallizes out. In a similar manner this process of separation can be applied to supersaturated sodium sulfate in separating it from sodium chloride during the fall of the previous year.

If the different salts that crystallize out due to change in weather conditions are deposited in such thick layers that they could be gathered up separately from each other, then it is not always necessary to transfer the brine from one pond to another upon change in the weather. The actual separation of the salts is accomplished by removing each layer separately. An example of this is in the evaporation of the brine in the summer when no potassium sodium sulfate is formed. The long period of summer crystallizes out a thick layer of sodium chloride. The brine is allowed to become saturated with potassium chloride at the beginning of the fall and is kept in the same pond to cool during the fall when it crystallizes out potassium chloride in a layer several inches thick. The potassium chloride can be gathered up from off the top of the sodium chloride, since the two thick layers of salts are readily differentiated from each other and separation is easily accomplished. The sodium chloride layer also acts as a flooring to the bottom of the pond and prevents any mud being gathered up with the potassium chloride.

Thus, by making use of various weather changes in the manner described above, I am able to effect practically a complete separation of the different salts in a complicated brine mixture.

I claim:

1. The process of recovering borax from aqueous solution containing borax and potassium chloride which consists in cooling the solution to crystallize out potassium chloride, removing the solution from the deposited crystals and exposing the brine to cold weather until borax crystallizes out.

2. The process of recovering borax from aqueous solution containing borax and potassium chloride which consists in cooling the solution to crystallize out potassium chloride, removing the solution from the deposited crystals and exposing the brine to cold weather until borax crystallizes out, removing the solution from the deposited borax, adding fresh solution and repeating the process.

3. The process of recovering borax from an aqueous brine containing borax and a potassium salt which consists in cooling the brine to crystallize out a potassium salt and allowing the borax to become supersaturated, removing the brine from the deposited crystals and agitating the brine to crystallize out borax.

4. The process of recovering borax from aqueous solution containing borax and a potassium salt which consists in cooling the solution to crystallize out a potassium salt, removing the solution from the deposited crystals and exposing the solution to cold temperatures to crystallize out borax.

5. The process of recovering borax from aqueous solution containing borax and a potassium salt which consists in cooling the solution to crystallize out a potassium salt, removing the solution from the deposited crystals and agitating the solution while cold to crystallize out borax.

GEORGE B. BURNHAM.